United States Patent

Takahashi

[11] Patent Number: 5,961,412
[45] Date of Patent: Oct. 5, 1999

[54] FABRIC FOR POWER TRANSMISSION BELT AND POWER TRANSMISSION BELT USING THE FABRIC

[75] Inventor: Osamu Takahashi, Kobe, Japan

[73] Assignee: Bando Chemical Industries, Ltd., Kobe, Japan

[21] Appl. No.: 08/897,361

[22] Filed: Jul. 21, 1997

[30] Foreign Application Priority Data

Jul. 23, 1996 [JP] Japan .................................. 8-193160

[51] Int. Cl.$^6$ .............. F16G 1/04; F16G 1/12; D03D 13/00
[52] U.S. Cl. ................... 474/270; 474/266; 428/222
[58] Field of Search ................... 474/202, 204, 474/205, 237, 238, 260, 261, 263, 265, 266, 267, 268, 270; 174/124 R, 121 R, 122 R, 128.1; 428/222, 295.1, 105, 109; 338/208, 262

[56] References Cited

U.S. PATENT DOCUMENTS

| | | | |
|---|---|---|---|
| 4,355,994 | 10/1982 | Brew | 474/266 |
| 4,457,743 | 7/1984 | Robecchi et al. | 474/260 |
| 4,522,883 | 6/1985 | Wallace et al. | 428/365 |
| 4,643,938 | 2/1987 | Oyama et al. | 474/263 |
| 4,936,814 | 6/1990 | Colley et al. | 474/263 |
| 4,950,212 | 8/1990 | Masuda et al. | 474/242 |
| 4,952,293 | 8/1990 | Sypula et al. | 204/180.7 |
| 5,007,884 | 4/1991 | Masuda et al. | 474/242 |
| 5,074,828 | 12/1991 | Ellis | 474/161 |
| 5,098,346 | 3/1992 | Redmond | 474/161 |
| 5,120,280 | 6/1992 | Mizuno et al. | 474/260 |
| 5,178,586 | 1/1993 | Mizuno et al. | 474/266 |
| 5,387,300 | 2/1995 | Kitamura | 156/148 |
| 5,521,007 | 5/1996 | Kurokawa | 428/364 |
| 5,545,097 | 8/1996 | Kitazumi et al. | 474/266 |
| 5,624,515 | 4/1997 | Onoe et al. | 156/148 |
| 5,653,655 | 8/1997 | Onoe et al. | 474/205 |
| 5,746,674 | 5/1998 | Tajima et al. | 474/266 |
| 5,779,584 | 7/1998 | Noguchi | 474/266 |

FOREIGN PATENT DOCUMENTS 7-41127  2/1995  Japan .

Primary Examiner—Tamara L. Graysay
Assistant Examiner—Matthew A. Kaness
Attorney, Agent, or Firm—Sixbey Friedman Leedom & Ferguson; Gerald J. Ferguson, Jr.; Thomas W. Cole

[57] ABSTRACT

A fabric 3 for power transmission belt to be adhered to a belt body 2 of a V-ribbed belt 1 is formed such that carbon fibers with electric conductivity are mixed through spinning into a fabric material such as cotton, nylon and polyester. This prevents the belt from producing a beating sound and producing worn-out dusts in the use as a power transmission belt and enhances the electric conductivity of the power transmission belt to successfully prevent electrostatic charge of the belt.

7 Claims, 1 Drawing Sheet

FABRIC FOR POWER TRANSMISSION BELT AND POWER TRANSMISSION BELT USING THE FABRIC

BACKGROUND OF THE INVENTION

This invention relates to a fabric for power transmission belt for reinforcing a power transmission belt and a power transmission belt using the same.

In general, a power transmission belt such as a V-belt and a v-ribbed belt transmits power by using a frictional force to pulleys and such a friction exerts a static electricity. A synchronous belt also involves a friction at the time of engagement with pulleys thereby producing a static electricity similarly. When such a static electricity is charged to the power transmission belt, pulleys and the like, the belt may be damaged or peripheral electric equipment may be broken down. Therefore, it has been required to make the power transmission belt conductive thereby preventing the power transmission belt from becoming electrostatically charged.

As a technique to meet the requirement, there is known a conventional technique of imparting electric conductivity to a power transmission belt in such a manner as to add a conductive material such as carbon and zinc powder to rubber cement which is used in a treatment to a fabric for belt to be adhered to the surface of a belt body.

In the above conventional technique, however, it is necessary to secure the electric conductivity of the belt surface over a specific level. Therefore, an amount of rubber cement used for the fabric for belt must be increased more than commonly used so that a rubber cement layer having a specific thickness is formed on the fabric surface which is to form the belt surface. As a result, when the transmission belt to which the fabric is adhered is used, the rubber cement is worn out or agglomerated due to friction to pulleys thereby readily forming a level difference on the fabric surface. This may produce a beating sound.

Further, in view of the need for maintaining the adhesive property or the like between the belt body and the fabric, an amount of carbon to be mixed into the rubber cement is limited. Accordingly, extensive improvement in electric conductivity cannot be expected and therefore an effect of successfully preventing electrostatic charge cannot be implemented.

Furthermore, since worn-out dusts of the rubber cement are produced, the power transmission belt cannot be used for applications averse to particulates such as applications involving foods.

An object of the present invention is to improve a method for making a power transmission belt conductive thereby preventing production of beating sound and production of worn-out dusts in using the power transmission belt and to further enhance the electric conductivity of a power transmission belt thereby successfully preventing electrostatic charge of the belt.

SUMMARY OF THE INVENTION

To attain the above object, the present invention adopts the configuration that a fabric itself adhered to a belt body has electric conductivity.

More specifically, in an aspect of claim 1 of the invention, a fabric for power transmission belt has electric conductivity.

The above arrangement eliminates the need to impart electric conductivity to rubber cement used in a treatment to a fabric for belt, thereby dispensing with the formation of a rubber cement layer having a specific thickness on the fabric surface. Accordingly, when a power transmission belt to which the above-mentioned fabric is adhered is used, it is avoided that the rubber cement is worn out or agglomerated due to friction to pulleys. Further, since the fabric itself has electric conductivity, the fabric surface can secure sufficient electric conductivity. Accordingly, when the power transmission belt is used, it produces neither beating sound nor worn-out dust. This enhances the electric conductivity of the fabric, and further, the power transmission belt to successfully prevent electrostatic charge of the belt.

The fabric for power transmission belt preferably contains carbon fibers. In a simple manner of mixing carbon fibers having electric conductivity into the conventional fabric material as a base fabric made of cotton, nylon, polyester or the like, the fabric for power transmission belt can have electric conductivity. In addition, since carbon fibers have high electric conductivity, the fabric can display excellent electric conductivity by the mixture of a small amount of carbon fibers. Accordingly, enhancement in electric conductivity of the fabric can be successfully implemented with ease.

Further, the fabric for power transmission belt is formed in a way that carbon fibers are mixed through spinning therein. Under this arrangement, carbon fibers can be uniformly mixed into the entire fabric for power transmission belt so as to be uniformly distributed on the fabric surface. This makes it possible to produce a fabric whose surface keeps constant electric conductivity, so that the fabric displays the above-mentioned operations and effects of the present invention well.

Further, each of the above-mentioned fabrics for power transmission belt may be adhered to the surface of a belt body thereby obtaining a power transmission belt. Under this arrangement, the same operations and effects as mentioned above can be obtained.

PREFERRED EMBODIMENT OF THE INVENTION

Figure 1:
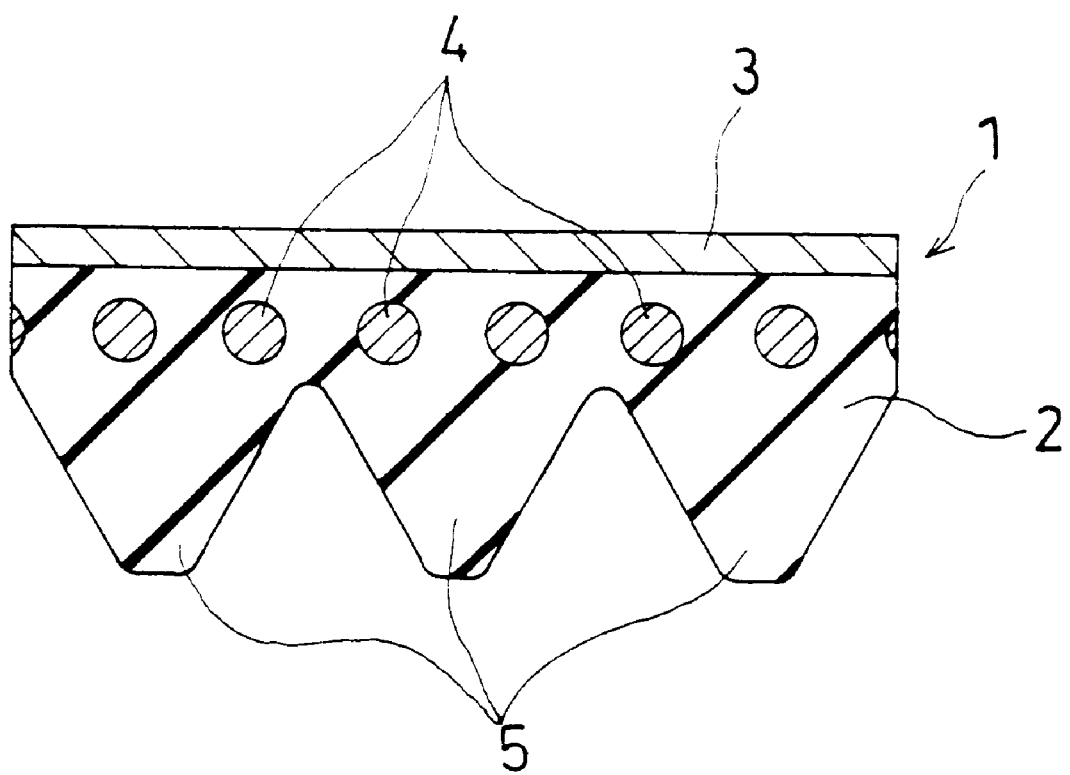
FIG. 1 is a cross-sectional view showing a V-ribbed belt as a power transmission belt according to an embodiment of the present invention.

Description is made below about an embodiment of the present invention with reference to the drawing. FIG. 1 shows a V-ribbed belt 1 as a power transmission belt according to an embodiment of the present invention. The belt 1 is composed of a belt body 2 and a fabric 3 for power transmission belt which is adhered to the back face (top face in the figure) of the belt body 2. The belt body 2 is made of rubber. In the belt body 2, a plurality of polyester fiber cords 4, 4, . . . as tension members are embedded at approximately uniform intervals in a width direction of the belt so as to extend in a circumferential direction of the belt. On the inner face (bottom face in the figure) of the belt body 2, three V-shaped ribs 5, 5, 5 are formed at approximately uniform intervals in the width direction of the belt so as to extend in the circumferential direction of the belt.

The fabric 3 is formed such that carbon fibers are mixed through spinning into a fabric material such as cotton, polyester or the like. Thus, the fabric 3 has electric conductivity. Then, the fabric 3 is treated with rubber cement and is adhered to the back face of the belt body 2 by curing.

According to the present embodiment, since carbon fibers having high electric conductivity are mixed through spinning into the fabric 3 for power transmission belt, this eliminates the need to impart electric conductivity to a rubber cement layer used in a treatment to the fabric 3 for power transmission belt, thereby dispensing with the formation of the rubber cement layer having a specific thickness on the surface of the fabric 3. Accordingly, when pulleys are arranged on the belt back face side, it is avoided that the rubber cement is worn out or agglomerated due to friction to the pulleys. This prevents production of beat sound and production of worn-out dusts.

Further, since carbon fibers are mixed through spinning into the same fabric material as in the conventional case, carbon fibers can be uniformly mixed into the entire fabric 3 so as to be uniformly distributed on the surface of the fabric 3. This makes it possible to produce a fabric 3 which has excellent electric conductivity and whose surface keeps constant electric conductivity. In addition, when the V-ribbed belt 1 to which the fabric 3 is adhered is used, electrostatic charge of the belt can be successfully prevented.

In the above embodiment, carbon fibers are mixed through spinning into the fabric 3 for power transmission belt of the V-ribbed belt 1. However, the present invention can be also applied to fabrics for power transmission belts such as a V-belt and a synchronous belt. Also in these case, electrostatic charge can be successfully prevented. The fabric 3 may be made conductive by conductive materials other than carbon fibers.

Next, a concrete example of the present invention is described. First, carbon fibers were mixed through spinning into the conventional fabric material thereby obtaining a fabric 3 for power transmission belt. The fabric 3 was treated with rubber cement and was then adhered to a belt body 2 by curing thereby obtaining a V-ribbed belt 1.

For comparison, two conventional fabrics were treated with carbon-containing rubber cement (Comparative Example 1) and common rubber cement containing no conductive material (Comparative Example 2) respectively, and these treated fabrics were then adhered to belt bodies 2 by curing respectively, thereby obtaining two kinds of V-ribbed belts.

In relation to the belt of the concrete example of the present invention and the belts of Comparative Examples 1 and 3, respective resistances were measured. Specifically, each belt was set at a 216 mm length, and an electric resistance between both ends of the belt was measured by a tester in a state that both the ends were caught in a jig.

The results of the above measurements are shown in Table 1.

TABLE 1

|  | Concrete Example | Comparative Example 1 | Comparative Example 2 |
| --- | --- | --- | --- |
| electric resistance | approximately 10Ω | 0.15 to 0.6 MΩ | ∞ |

As seen from the above Table 1, the belt of the concrete example of the invention is extremely smaller in electric resistance than Comparative Examples and has much excellent electric conductivity.

What is claimed is:

1. A power transmission belt comprising:
   a belt body for transmitting a mechanical load, and
   a fabric formed from spun fibers adhered to a side of said belt body and defining a side surface of said belt, said fabric including spun carbon fibers for rendering said fabric into an electrical conductor.

2. The power transmission belt according to claim 1, wherein said fabric also includes spun non-conductive fibers, the non-conductive fibers of said fabric being one of the group consisting of cotton, nylon, and polyester.

3. The power transmission belt according to claim 1, wherein the electrical resistance of said fabric is about 10 ohms per 0.25 meters.

4. The power transmission belt according to claim 1, wherein said belt body is one of the group consisting of a V-ribbed belt, a V-belt and a synchronous belt.

5. The power transmission belt according to claim 1, wherein said belt body is formed of rubber.

6. The power transmission belt according to claim 5, wherein the belt body includes reinforcing cords.

7. A power transmission belt comprising:
   a belt body for transmitting a mechanical load, and
   a fabric formed from spun fibers adhered to a side of said belt body and defining a side surface of said belt, said fabric including spun electrically conductive fibers for rendering said fabric into an electrical conductor.

* * * * *